United States Patent [19]
Moller

[11] Patent Number: 5,923,154
[45] Date of Patent: Jul. 13, 1999

[54] VOLTAGE BOOST CIRCUIT

[75] Inventor: David Dale Moller, Westfield, Ind.

[73] Assignee: Delco Electronics Corp., Kokomo, Ind.

[21] Appl. No.: 08/846,189

[22] Filed: Apr. 28, 1997

[51] Int. Cl.⁶ ................................................ H02M 3/156
[52] U.S. Cl. .......................... 323/222; 323/284; 323/286
[58] Field of Search .................................... 323/222, 259, 323/282, 284, 285, 299, 301, 344, 349, 350, 351, 286; 363/50, 49

[56] References Cited

U.S. PATENT DOCUMENTS 5,142,217  8/1992  Gontowski, Jr. ......................... 323/222
5,612,610  3/1997  Borghi et al. ............................ 323/222
5,621,635  4/1997  Takiar ...................................... 363/141

*Primary Examiner*—Peter S. Wong
*Assistant Examiner*—Y. J. Han
*Attorney, Agent, or Firm*—Jimmy L. Funke

[57] ABSTRACT

A voltage boost circuit having a voltage output and a single input receives a DC voltage from an external source which is fed to an inductor. The input voltage is boosted to provide a constant voltage at the output at a level higher than the voltage input. A switch is coupled to the output of the inductor for controlling current through the inductor to induce a boosted voltage across the inductor.

3 Claims, 2 Drawing Sheets

VOLTAGE BOOST CIRCUIT

BACKGROUND OF THE INVENTION

The invention relates in general to a voltage boost circuit, and more particularly, to a voltage boost circuit having a single inductor. The voltage boost circuit provides a regulated constant first output at a potential above the supply voltage.

Various voltage boosting systems are known for outputting constant raised voltages from fluctuating input voltages. Such systems have been used in automotive electronics applications. For the past several years, the number of electronics devices in automobiles has increased rapidly as vehicles have become more sophisticated. In many instances electronic devices that were not available several years ago are standard equipment in current automobiles. Much of this new equipment is computer controlled and requires energization from regulated constant voltage.

Automobiles have "body computers" for controlling items such as lamps, automatic door locks, windows, and the like. Computers are also necessary for many dashboard components, such as trip computers and other digital display devices. It is known, however, that the majority of these devices requires their own particular voltage levels for proper operation.

Typically, motor vehicles utilize a 12-volt storage batteries while providing battery voltages between 9 volts and 12.5 volts. However, automobile batteries are generally unable to provide constant voltages during different operating conditions. Large current draw devices, such as the starter, may cause the battery voltage to drop as low as 4.5 volts during a cold-crank start. The battery voltage may range as high as 35 volts during other transient conditions. Because of these wide voltage fluctuations such unregulated battery power is unsuitable for the voltage critical applications as described above.

A known voltage boost circuit comprises an inductor coupled to receive an input battery voltage which causes an inductor current to flow. From time to time the inductor current is interrupted by a switch thereby inducing an inductor voltage greater than the input battery voltage. Current pulses resulting from the switching incrementally charge a capacitor to a desired output voltage, at which point the switching is suspended. As current is drawn from the capacitor further inductor current pulses are generated by operating the switch at a fixed frequency, which generally allows each pulse of inductor current to decay to zero before the switch is closed.

In operation, the pulses are generated using a 50% duty cycle internal pulse generator that is enabled when the battery potential goes below a certain voltage level, typically 9 volts. At that point, the inductor is modulated at 50% so that the output voltage is regulated at 9 volts or is boosted to a higher voltage. Unfortunately, such known voltage boost circuits have relatively low switching frequencies. This results in the need for relatively very large and expensive inductors having inductance in the range of approximately 300 microhenries to 400 microhenries, to provide the appropriate current and voltage levels and to prevent the output current from decaying to zero before the switch switches and the current can be built back up. Therefore such large inductors are necessary to maintain the appropriate amount of current flow to the output for an extended period of time between switching in order to prevent the capacitor output voltage from dropping below its required level. A further disadvantage of these prior voltage boost circuits is that their output voltages are regulated by "dropping" current-providing cycles in order to avoid exceeding a preselected output voltage. The cycles are dropped by stopping switch cycling. This causes a quasi-DC current to flow through the inductor. The quasi-DC current is limited primarily by the internal resistance of the battery and the resistance of the inductor itself. The result is a large current draw which wastes current and may overheat the circuit. However, as can be seen, this results in a waste of current and a voltage boost circuit that generates excessive heat from constantly being on.

Prior voltage boost circuits also have the disadvantage of using voltage comparators to enable or disable the boost circuitry. As such, because of the absence of hysteresis on these voltage comparators, a significant amount of noise from electromagnetic interference (EMI) is generated when the voltage boost circuitry is switched on and off. The noise is generated by the jitter caused in the circuit due to the fairly rapid switching of the voltage boost circuit, and may in turn cause noise to be heard on the car radio and other radio frequency type devices.

SUMMARY OF THE INVENTION

A voltage boost circuit for receiving a variable DC voltage at a first DC voltage level for providing a source of direct current, and providing a constant output DC voltage is disclosed herein. The voltage boost circuit includes a small value inductor, such as a surface mount inductor, for inducing relatively small currents. An inductor voltage comparator is connected to the inductor for measuring the voltage at the inductor and for enabling the voltage boost circuit when the voltage at the inductor falls below a certain threshold value. An inductor cycling switch is coupled to the inductor and is responsive to the inductor voltage comparator. The inductor cycling switch is used to control the amount of current flow from the inductor to the output. The output is a charge storing device such as an output load capacitor that is connected from a boost point to ground.

The inductor cycling switch is repeatedly turned on and off to cause current to flow through the inductor and the inductor cycling switch. Once the current reaches a particular level, the inductor cycling switch is turned off and the current flows to the output load capacitor. This process continues until the voltage at the output load capacitor is at a desired value. Because the inductor cycling switch operates at a relatively fast speed and thereby prevents the current from dropping to zero, a smaller value inductor may be used. As such, the inductor is required to carry far less current than a larger value inductor.

An inverting comparator connected to the boost point senses the voltage at the output and disables the inductor cycling switch when the voltage at the boost point exceed a threshold value. Similarly, the inductor cycling switch is enabled when the voltage at the boost point and the voltage across the inductor fall below a certain threshold value. By closely monitoring the inductor voltage and the output boost voltage, the load connected to the output load capacitor is guaranteed to not receive an excessive amount of current.

Schmitt triggers may be used as the inductor voltage comparator and the inverting comparator to introduce a small amount of hysteresis in the system. Thus, the inductor cycling switch will not constantly turn off and on to compensate for insignificantly small fluctuations in the output voltage.

It is an object of the present invention to solve various problems of the prior art.

It is yet another object of the present invention to decrease the size and cost of the voltage boost circuit. It is yet another object of the present invention to protect the load on the output by limiting excess current available at the voltage output.

It is yet another object of the present invention to decrease the amount of noise generated by the activation and deactivation of the voltage boost circuit.

It is yet another object of the present invention to prevent overheating of the circuit by becoming inactive when proper output voltage is available at the voltage output.

It is yet another object of the present invention to use a relatively smaller value inductor to provide boosted voltage.

DETAILED DESCRIPTION OF THE PREFERRED EMBODIMENT

The present invention relates to a voltage boost circuit having a constant regulated output and a single input. The input is by way of a small inductor, such as a surface mount type inductor and the output is at a different voltage than the input. The voltage boost circuit is enabled in those instances when the voltage at the output and the voltage at the inductor are below their respective maximum threshold values.

In order to enable use of the smallest and least costly input inductor, a surface mount type inductor is used. Because the inductor is a surface mount type device, the induced current in such an inductor is relatively small compared to the large lead type inductors previously used as mentioned above. Accordingly, the inductor used in this invention is used in such an efficient manner as to utilize practically all the available current that the inductor can provide. Thus, the inductor size contemplated in this invention may be as small as 50 $\mu$H to 100 $\mu$H and yet still provide the necessary amount of current for proper operation of the devices connected to the outputs. In addition, because of the small size of the inductor, relatively fast switching is also utilized to prevent the current output from decaying to zero, thereby making efficient use of each switch cycle to provide the needed current.

A further advantage of using a small inductor is the minimization of heat generated by the voltage boost circuit. Because the circuit is intended to be housed in an enclosure protecting it from the elements, it is desirable that the voltage boost circuit generate as little heat as possible to prevent thermal problems.

Another advantage of the present invention is the ability to monitor the voltage available at the outputs and to supply current to only those outputs that require boosted voltage levels. This enables each current cycle to be used where it is needed, without wasting current on outputs that are already at their appropriate levels.

Another advantage of the present invention is that the voltage boost circuit will disengage when the voltage outputs are at their appropriate levels, thereby preventing overheating of the circuit.

The voltage boost circuit, other than for the surface mount inductor and surface mount output load capacitor, is designed to be implemented in silicon and surface mounted along with the inductor and capacitors. This results in the smallest possible circuit at the least cost. Furthermore, Schmitt triggers, which introduce a small amount of hysteresis in the system, may be used to switch the circuit on and off only at appropriate voltage levels to decrease unwanted noise and other electrical emissions.

Figure 1:
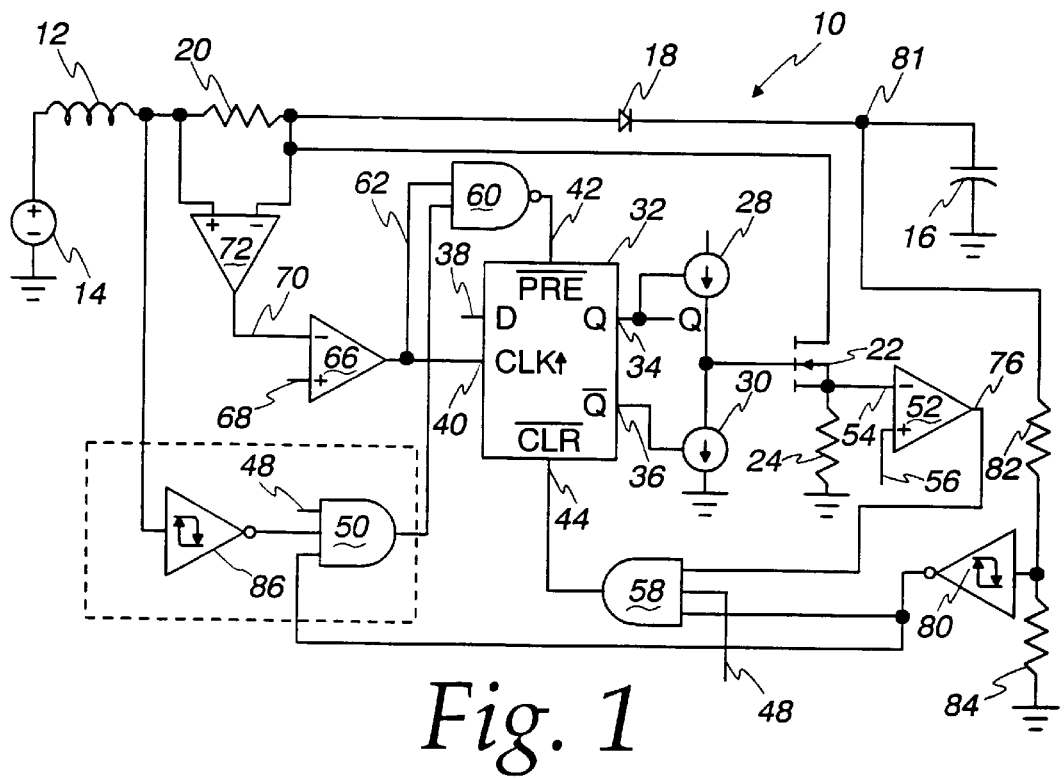
FIG. 1 is a schematic diagram of a voltage boost power supply embodying the present invention.

Referring now to the drawings, and in particular, to FIG. 1, a voltage boost circuit embodying the present invention is shown therein and generally identified by reference numeral 10. The voltage boost circuit 10 has a single inductor 12 at its input and a capacitor 16 as the voltage output. An inductor cycling switch 32 is coupled to the inductor 12 to control the current flow from the inductor 12 to the output load capacitor 16. Inductor voltage comparator 86 and output voltage comparator 80, which may be inverting type Schmitt triggers, are used to only enable the voltage boost circuit 10 when the voltage at the output of the inductor 12 is below a predetermined level and when the output voltage at the output load capacitor 16 is below another predetermined voltage level. Schmitt triggers are preferably used in order to introduce a small amount of hysteresis into the system. Because the outputs can tolerate several hundred millivolt of fluctuation, the hysteresis is advantageously used to prevent rapid switching of the FET 22, thereby preventing EMI causing jitter in the circuit. Limiting enablement of the voltage boost circuit 10 to the above conditions prevents the voltage boost circuit 10 from boosting when the voltage at the inductor is above a predetermined threshold level. This guarantees that the voltage boost circuit does not operate at indirectly sensed input voltage over a predetermined level, thereby preventing radiant emissions.

The voltage boost circuit 10 receives a DC input voltage from the automobile battery at a voltage input 14 and provides a constant output voltage at a first output load capacitor 16, either boosted or unboosted, depending on whether the voltage boost circuit 10 is enabled. The output voltage available at output load capacitor 16 is required to be at a constant voltage. As mentioned above, small fluctuations of up to several hundred millivolts are also acceptable. Comparators 52 and 66 set the maximum and minimum threshold voltage available at output load capacitor 16 at which the voltage boost circuit 10 will deactivate and activate, respectively.

Power input to the voltage boost circuit 10 as shown in FIG. 1 for use, for example, in automotive applications is supplied by a vehicle battery having 12 volts nominal voltage. The output potential of the voltage boost circuit 10 is intended to be 9 volts at the output load capacitor 16 as set by voltage setting resistors 82 and 84. The output load capacitor 16 is coupled by a steering diode 18 to the voltage boost circuit 10. The steering diode 18 functions as a blocking diode to prevent current backflow into the voltage boost circuit 10.

The voltage booster includes a charging circuit that includes the vehicle battery input 14, which is connected to an inductor 12, a first current sensing resistor 20, a switching transistor, such as field effect transistor (FET) 22 and a second current sensing resistor 24, all in series. The steering diode 18 is connected to the junction 26 of the first current sensing resistor 20 and the FET 22. The steering diode 18 is used as a blocking diode to prevent current backflow into the voltage boost circuit 10 when the FET 22 is on. The FET 22, as done in classic power boost circuits, is repeatedly turned on and off to cause current to flow through the inductor 12 and the FET 22. Once a certain amount of current is detected flowing through FET 22, the FET 22 is turned off. At that point, the current is forced to flow through to the output load capacitor 16. This process is repeated as necessary to maintain the proper voltage level at the output load capacitor 16.

The particular type of inductor 12 used in this invention is, as mentioned above, generally a small, surface mount type component. In addition, the inductor 12 is chosen such that it is of the smallest value possible to provide the necessary amounts of current. As such, the inductor 12 is selected by assessing the amount of current that will be drawn at the output load capacitor 16 and then back calculating the value of the inductor. Because the inductor 12 is used as efficiently as possible by using all its available current, the value of the inductor 12 may be $\frac{1}{3}$ to $\frac{1}{2}$ the value of typically used lead inductors, thereby enabling use of surface mount components. As mentioned above, this results in significantly less heat being generated by the circuit relative to known voltage boost circuits.

The FET 22 is controlled by a current source 28 that provides the current to the FET 22 necessary to turn the FET 22 on. Current source 28 is required because the amount of current required to turn FET 22 on is much greater than can be supplied by digital devices. Preferably, the current source 28 is connected to the highest potential in the system, such as the boost point 81, to minimize losses in the system. Similarly, a current sink 30 is provided to turn FET 22 off by preventing current from activating FET 22. The current sink 30 and current source 28 are controlled by the inductor cycling switch 32, which may be a D-type flip-flop. In this case, the Q output 34 of the inductor cycling switch 32 controls the current source 28 and the OVERLINE Q output 36 controls the current sink 30. The data input (D) 38 of the inductor cycling switch 32 is coupled to a regulated voltage $V_{CC}$ (not shown), so that a high-going signal on the clock input 40 of the inductor cycling switch 32 will cause Q output 34 of the inductor cycling switch 32 to output a logic "1" and OVERLINE Q 36 to output a logic "0". A low-going signal on the clock input 40 of the inductor cycling switch 32 will cause the inductor cycling switch 32 to become inert and maintain its state on its Q output 34 which, in this case, is a logic "1". As further explained below, this will cause the Q output 34 to output a logic "0" and OVERLINE Q output 36 to output a logic "1". Depending upon the clock signal 40 into the inductor cycling switch 32, the FET 22 will therefore either open or close. In addition, a logic "0" into the preset ("pre*") input 42 of the inductor cycling switch 32 will set the Q output 34 to logic "1". Similarly, a logic "0" into the clear ("clr*") input 44 of the inductor cycling switch 32 will set the Q output 34 to logic "0". As shown, in all instances the Q output 34 and OVERLINE Q output 36 will be logical opposites. The voltage boost circuit 10 starts itself when the output voltage (as measured at boost point 81) at the output load capacitor 16 falls below its predetermined threshold value, when the voltage output from the inductor 12 is also below a predetermined threshold and when signal ENAB 48 into AND gate 50 is a logic "1". Furthermore, the voltage boost circuit 10 operates in a continuous mode of operation, wherein the inductor 12 current is always greater than zero and the maximum amount of booster current is always available. Signal ENAB 48 is simply a power supply stabilization signal from another part of the system (not shown) that indicates that the system has stabilized and is ready for operation. The voltage boost circuit stops itself when the output voltage at output load capacitor 16 reaches its threshold voltage level. As mentioned above, the minimum current comparator 66 and the maximum current comparator 52 are used to set threshold currents for the voltage boost circuit 10. In particular, by setting a minimum current threshold, the current output from the voltage boost circuit 10 is guaranteed to always be in a continuous mode of operation wherein the current available at the output 16 never drops to zero. In addition, the maximum current threshold level assures that the current available at the output load capacitor 16 does not exceed the amount necessary for proper operation of the load device. This results in reduced heat in the circuit and reduced power draw from the inductor 12, which is particularly important because the inductor 12 core should not be allowed to saturate. Operating beyond the saturation point could cause thermal problems because of DC flowing through the inductor 12 when the inductor 12 core is saturated.

The FET 22 is turned off by the maximum current comparator 52 when the current exceeds a predetermined threshold. In particular, inverting input 54, is coupled to a second current sense resistor 24. The other input 56 (non-inverting) of the maximum current comparator 52 is connected to a reference voltage, which indicates the predetermined maximum amount of current that the inductor 12 will produce. The output from the maximum current comparator 52 is then coupled to the clr* input 44 of the inductor cycling switch 32 by way of AND gate 58. Therefore, if the FET 22 is conducting, and as the current in the inductor increases and exceeds the maximum reference current, the maximum current comparator 52 output will go to a logic "0". Accordingly, the AND gate 58 output will be logic "0", thereby causing the inductor cycling switch 32 to clear. As mentioned above, this will cause the OVERLINE Q output 36 of the inductor cycling switch 32 to a logic "1", thereby enabling current sink 30 and causing FET 22 to turn off. Thus the inductor cycling switch 32 is preset when the output of NAND gate 60 is a logic "0". Such a condition will occur only when inputs 62 and 64 into NAND gate 60 are logic "1". One of the NAND gate 60 inputs, in particular, the output from minimum current comparator 66, will be a logic "1" when current through the inductor 12 has not increased beyond a certain minimum threshold. As shown, the non-inverting input 68 of the minimum current comparator 66 is connected to a reference voltage for establishing the minimum amount of current that inductor 12 will produce. The inverting input 70 of the minimum current comparator 66 is connected to the output of converting comparator 72. Converting comparator 72 simply acts as a current and voltage converting circuit that tracks the current level flowing through the first current sensing resistor 20 and feeds the result into the non-inverting input 70 of minimum current comparator 66. Therefore, until the current through the inductor 12 causes first current sensing resistor 20 to exceed the threshold voltage level set by the reference voltage into minimum current comparator 66, the output of minimum current comparator 66 will be a logic "1". Because both the inputs into NAND gate 60 are a logic "1", the output of NAND gate 60 into the pre* input 42 of the inductor cycling switch 32 will be a logic "0". As a result, the inductor cycling switch 32 will "set", causing the Q output 34 of the inductor cycling switch 32 to be a logic "1", and the OVERLINE Q output 36 to be a logic "0", thereby enabling the current source 28 and disabling the current sink 30, respectively. Thus, FET 22 will turn on. This condition will exist until the minimum current threshold is exceeded, at which time the minimum current comparator 66 will output a logic "0". As a result, the clock input 40 to the inductor cycling switch 32 will go "low", thereby causing the inductor cycling switch 32 to become inert, and will stop actively forcing a logic "1" at the Q output of the inductor cycling switch 32. At this point, however, the Q output will remain a logic "1" and will maintain the FET 22 in an "on" state.

As inductor 12 current increases (monitored by current sensing resistor 20) the current will increase past the threshold value set by the minimum current comparator 66. As the current continues to increase and flows through FET 22, the current level will increase beyond the threshold level set by maximum current comparator 52 (as measured by second current sense resistor 24) and will cause a logic "0" at the output of the comparator 52. This, in turn, will cause a logic "1" at the output of AND gate 58. Because the clock input 40 of the inductor cycling switch 32 had already been turned "off" by the minimum current comparator 66, the inductor cycling switch 32 will cause the inductor cycling switch 32 to clear, thereby enabling current sink 30 and disabling current source 28. Accordingly, this will switch FET 22 off and will cause the output 76 of the maximum current comparator 52 and the output 78 of AND gate 58 to a logic "1", thereby releasing the clr* input 44 of inductor cycling switch 32. At this point, the current flowincurrent flowing in the inductor 12 decreases and begins to flow through steering diode 18 into first output load capacitor 16. The current flow through the inductor 12 is measured by first current sensing resistor 20. Once the current decreases below the threshold limit set by minimum current comparator 66, the output of minimum current comparator 66 will become a logic "1" The logic "1" output of the minimum current comparator 66 (which is connected to the clock input 40 of the inductor cycling switch 32) will act as a rising edge and will, once again, set inductor cycling switch 32. In addition, since the output of AND gate 58 and minimum current comparator 66 are a logic "1", the output of NAND gate 60 will be a logic "0". In normal operation, this would cause inductor cycling switch 32 to set. However, since in this case inductor cycling switch 32 has already been set, NAND gate 60 will have no effect on the inductor cycling switch 32 thereby remaining in a continuous mode of operation, wherein the inductor 12 current is always greater than zero and the maximum amount of booster output current is always available. The voltage boosting continues until the voltage output at output load capacitor 16 exceeds its respective threshold values or ENAB 48 goes "low". The voltage boost circuit 10 will re-enable once the starting conditions described above are again met, e.g., the voltage at output load capacitor 16 is below its respective threshold value and if ENAB 48 is high.

Figure 2:
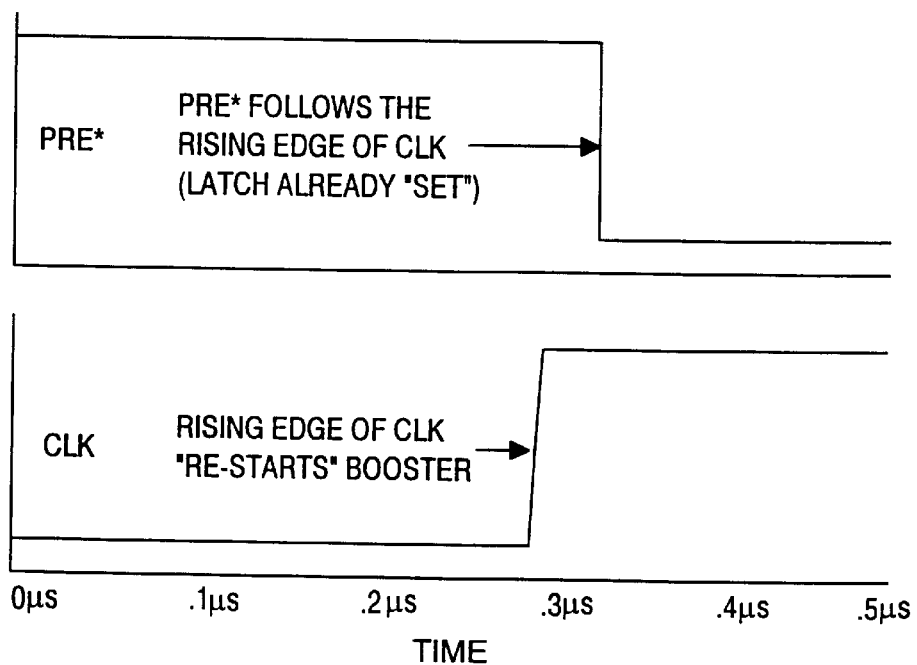
FIG. 2 is a waveform diagram illustrating initial operation of the inductor cycling switch of the circuit shown in FIG. 1.

In the embodiment described herein, four different operating modes are contemplated. An overview of the voltage boost circuit in operation is shown in FIG. 2. In a non-operational mode, the voltage at the output load capacitor 16 is at its appropriate level and therefore requires no boosting. FIG. 2 further illustrates an initial operational mode, wherein the inductor cycling switch 32 prepares for initial operation by pre-clearing on the first cycle. FIG. 2 further illustrates the operational mode, wherein the output load capacitor 16 is below its minimum threshold value, and therefore requires service. FIG. 2 further illustrates the operational mode, wherein the voltage boost circuit reenables when the output voltage at load capacitor 16 falls below its minimum threshold after having been boosted.

In the operational mode, since the voltage at output load capacitor 16 is above the threshold limit set by inverting comparator 80, the output of the inverting comparator 80 will be a logic "0", which causes NAND gate 58 to have a logic "0" output as well. Therefore, inductor cycling switch 32 will clear, thereby disabling the voltage boost circuit.

In the initial operational mode (FIG. 2), when first output load capacitor 16 is below its threshold value and the voltage at the output of inductor 12, as measured by the inverting inductor voltage comparator 86, is below its predetermined threshold voltage, the voltage boost circuit will activate. During the initial cycle, immediately after the voltage boost circuit activates, the inductor cycling switch 32 will preclear. In particular, the output voltage at inductor 12 will be below its threshold value, causing inverting inductor voltage comparator 86 to output a logic "1" into AND gate 50 and causing the output of minimum current comparator 66 to set the clock input 40 of the inductor cycling switch 32 to go high. In addition, voltage at boost point 81 will also be below its predetermined threshold value, causing inverting capacitor 81 to also output a logic "1" into the other input of AND gate 50. Accordingly, the inputs to NAND gate 60 will be logic "1", thereby causing the inductor cycling switch 32 to preset and begin the voltage boosting process by turning the FET 22 on. First output load capacitor 16 will receive every current pulse from the voltage boost circuit 10 until the predetermined threshold voltage is exceeded.

Figure 3:
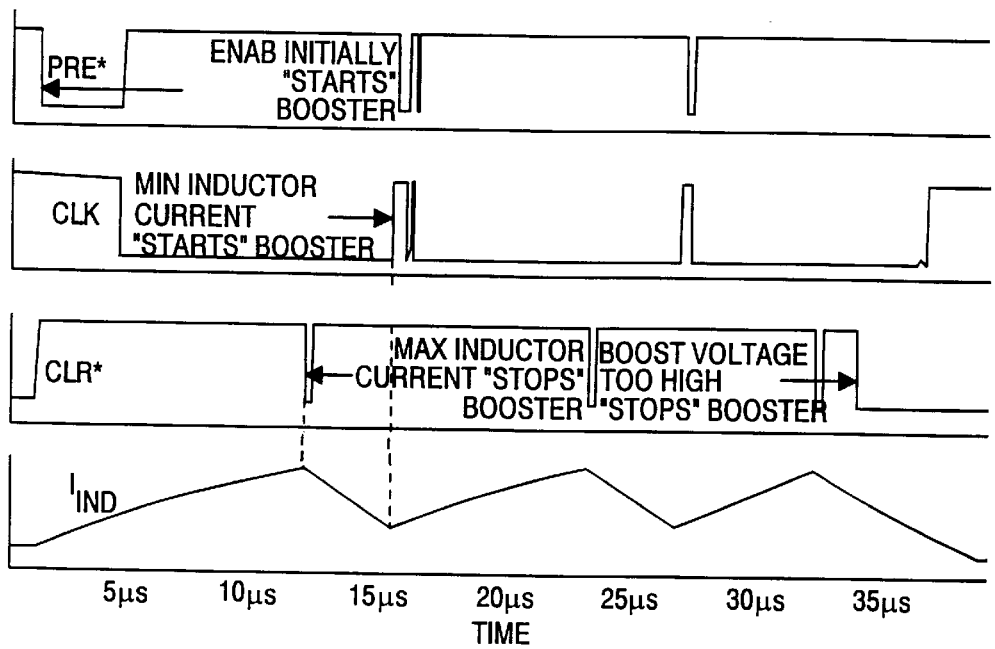
FIG. 3 is a waveform diagram illustrating circuit operation in a first enabled mode of operation.

In the operational mode (FIG. 3), when output load capacitor 16 is below its threshold value, the voltage boost circuit will activate in the manner explained above.

Figure 4:
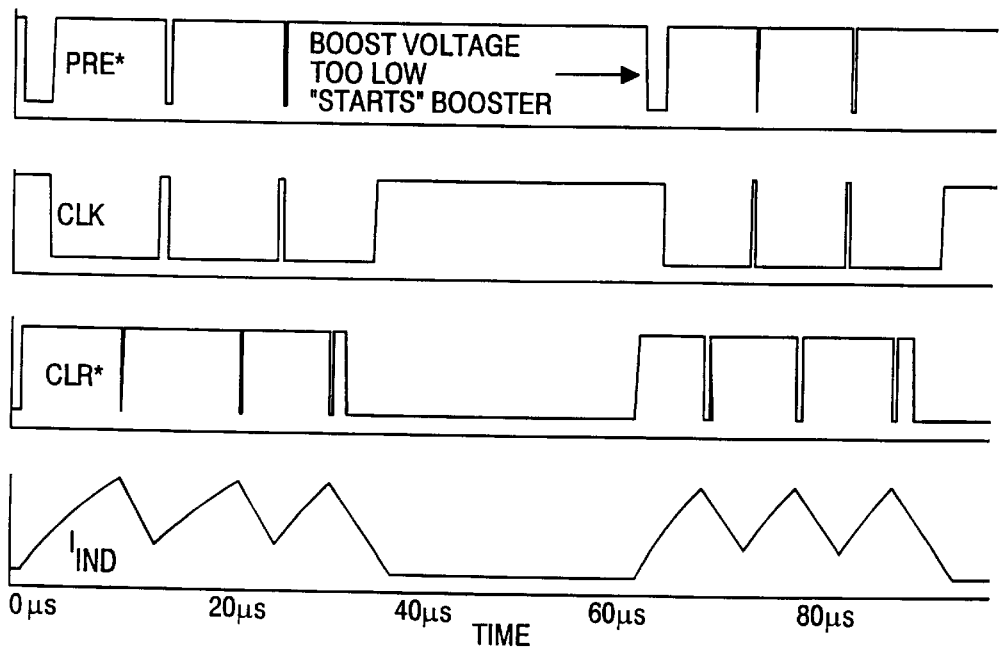
FIG. 4 is a waveform diagram illustrating circuit operation in a re-enabled mode of operation.

In the reenable mode (FIG. 4), once output load capacitor 16 and inductor 12 output voltage fall below their respective threshold levels, the voltage boost circuit will once again activate as described above.

It can be seen that the voltage boost circuit of the present invention provides a regulated output at load capacitor 16 from input inductor 12. The inductor 12 is sized such that a relatively smaller sized surface-mount type inductor may be used in the voltage boost circuit to minimize the cost and size of the voltage boost circuit. Furthermore, the current flow in the core of the inductor 12 is limited to prevent saturation.

Obviously, many modifications and variations of the present invention are possible in light of the above teachings. Thus, it is to be understood that, within the scope of the appended claims, the invention may be practiced otherwise than as specifically described above.

What is claimed is:

1. A voltage boost circuit connected to a direct current source having a source voltage that varies over a range of voltages, the boost circuit providing an output voltage that is maintained at a substantially constant value within said range of voltages, comprising:

an inductor coupled to said direct current source;

an inductor cycling switch coupled to said inductor and effective when enabled to complete a current path between said inductor and said direct current source such that the current in said inductor cycles between minimum and maximum values;

a charge storing device coupled to said inductor to provide said output voltage;

an inductor voltage comparator for measuring a voltage at said inductor;

an output voltage comparator for measuring said output voltage; and a logic circuit coupled to the inductor voltage comparator and the output voltage comparator for enabling the inductor cycling switch when the measured output voltage and the measured inductor voltage are below a first set of voltage thresholds determined in relation to said substantially constant value, and for disabling the inductor cycling switch when the measured output voltage or the measured inductor voltage are above a second set of voltage thresholds determined in relation to said substantially constant value.

2. A voltage booster as recited in claim 1 wherein said first and second sets of threshold voltages define predetermined levels of hysteresis for said inductor voltage comparator and said output voltage comparator.

3. A voltage booster as recited in claim 2 wherein said inductor voltage comparator and said output voltage comparator comprise Schmitt triggers.

* * * * *